United States Patent [19]
Verdier

[11] 3,757,844
[45] Sept. 11, 1973

[54] HIGH-SPEED RADIAL TIRE
[75] Inventor: Henri Verdier, Beauregard-L'Eveque, France
[73] Assignee: Compagnie Generale Des Etablissements Michelin, raison sociale Michelin & Cie, Clermont-Ferrand (Puy-de-Dome), France
[22] Filed: Dec. 13, 1971
[21] Appl. No.: 207,323

[30] Foreign Application Priority Data
Dec. 30, 1970 France .............................. 7047651

[52] U.S. Cl. .......................................... 152/361 FP
[51] Int. Cl. ............................................... B60c 9/18
[58] Field of Search ....................... 152/361, 361 FP, 152/361 R

[56] References Cited
UNITED STATES PATENTS
2,982,328  5/1961  Emanueli et al. .................. 152/361
3,500,889  3/1970  Boileau ............................... 152/361
3,310,094  3/1967  Prevost ............................... 152/361
2,939,502  6/1960  Hindin et al. .................... 152/361 R Primary Examiner—Robert G. Sheridan
Assistant Examiner—George H. Libman
Attorney—Granville M. Brumbaugh, Donald S. Dowden et al.

[57] ABSTRACT

The carcass reinforcement of a radial tire having a substantially cylindrical tread reinforcement meets the tread reinforcement tangentially at points of the tread reinforcement near or at the edges thereof, and the carcass and tread reinforcements are substantially in contact with each other over a width at least equal to the minimum width of the carcass reinforcement at the height of the bead wires. This permits continuous high-speed travel without danger of ply separation.

5 Claims, 2 Drawing Figures

HIGH-SPEED RADIAL TIRE

BACKGROUND OF THE INVENTION

This invention relates to radial tires and, more particularly, to novel and highly-effective radial tires particularly adapted for continuous operation at high speed.

A radial tire has a carcass reinforcement comprising cords arranged in radial planes of the tire and a tread reinforcement comprising cords arranged in two different directions which are slightly inclined with respect to the longitudinal direction, these cords being triangulated either by a third tread ply or by the carcass ply or plies. The present invention concerns especially the structure and meridian profile of the carcass and tread reinforcements.

It has already been proposed in U.S. Pats. to Massoubre Nos. 3,357,470 and 3,404,721 to form the tread reinforcement of a radial tire by a plurality of plies, one of which has its lateral portions bent in such a manner as to cover the others. This tread reinforcement arrangement is favorable for high-speed travel, particularly when the tread reinforcement is relatively cylindrical, that is to say has a radius of transverse curvature larger than its radius of longitudinal curvature.

However, despite its superiority over other types of tread reinforcement, particularly for high-speed travel, this type of tread reinforcement with folded ply and low transverse curvature does not solve all the problems to which high-speed travel gives rise.

In conventional tires the meridian profile of the tire, that is to say the shape of the section through a radial plane, is practically determined by the principal dimensions, namely diameter of the bead seats and maximum axial width of the tire. Based on these principal dimensions, standards determine within narrow limits the other characteristic dimensions of the tire, in particular the distance between the bead seats and the maximum diameter of the tire. Based on these data, the laws which govern the equilibrium profile of a carcass under the tension of the cords which is produced by the inflation pressure cause the carcass to have a relatively pronounced curvature at the top. In order to take up the difference in curvature between a relatively highly curved carcass and a relatively uncurved tread reinforcement, a layer of rubber of variable thickness is placed between the carcass and the tread reinforcement, this layer separating the carcass and the tread reinforcement over a fraction, or even all, of the width of the tread reinforcement. The result is that the two reinforcements are either entirely separated or else adjoin tangentially only in the vicinity of the median plane, or else, if they touch each other over more than half the width of the tread, do not come together tangentially but along an appreciable angle.

These conventional arrangements are not completely satisfactory. In order to produce a high-speed tire with a flat, rigid tread it is necessary to abandon the carcass equilibrium profiles imposed by compliance with the standards.

SUMMARY OF THE INVENTION

An object of the invention is to make a further advance in the state of the art as described above and to provide a radial tire better adapted than prior tires for sustained high-speed travel. More particularly, an object of the invention is to improve the bond between the carcass reinforcement and a tread reinforcement having small transverse curvature and being strengthened at its edges, by the selection of a meridian profile for the carcass reinforcement which is particularly adapted for use in combination with a tread reinforcement having a flat or substantially flat meridian profile.

The foregoing and other objects are attained in accordance with the invention by the provision of a radial tire having a tread reinforcement the transverse curvature of which is less than its longitudinal curvature and the lateral portions of which are specially reinforced, in particular by the use of folded cords. The tire is characterized in that, in an inflated condition, the carcass and the tread reinforcement adjoin tangentially at points of the tread reinforcement close to the ends of the tread reinforcement and are in contact with each other over a width at least equal to the minimum width of the carcass at the location of the steel bead wires.

Preferably the carcass and the tread reinforcement are in contact with each other over the entire width of the tread reinforcement and come together tangentially at the ends of the tread reinforcement.

The combined use of a tread reinforcement of substantially flat meridian profile and of a carcass of equilibrium profile tangent to the tread reinforcement at a large distance from the median plane imparts a very special shape to the tire. Each sidewall has a meridian profile similar to that of half a pear: the portion located between the connection with the tread and the zone of the sidewall of maximum width is strongly curved and is of unusually small height, while the portion of the sidewall located between the zone of maximum width and the bead has a generally conical shape. As compared with a conventional tire of the same diameter at the tread and of the same axial width, the tire in accordance with the invention has a height above the rim which is definitely smaller and it is therefore suitable for use with a rim of larger diameter. In general, in a tire in accordance with the invention, the ratio $H/B$ of the height $H$ to the breadth $B$ of the carcass is between 0.60 and 0.75. That is, $0.60 < H/B < 0.75$.

In accordance with the invention, the tangential connection, in the inflated condition of the tire, of the carcass reinforcement and the tread reinforcement at the ends or in the vicinity of the ends of the tread reinforcement removes the surroundings of the ends of the tread reinforcement from stresses owing to the tension of the carcass cords. Whereas truck tires of conventional manufacture cannot for long sustain a speed of 120 or 130 km/hr without damage, tires in accordance with the invention easily withstand such speeds without damage until completely worn.

One can proceed as follows in order to obtain a carcass whose meridian profile, when the tire is inflated, is tangent to a given tread reinforcement at the edges of the tread reinforcement or at points close to the edges of the tread reinforcement.

The meridian profile of a radial-carcass tire in natural equilibrium between the inflation pressure and the tensile forces of the carcass cords satisfies the equation:

$$\cos \psi = R^2 - R_e^2/R_s^2 - R_e^2 \qquad (1)$$

in which:

$R_s$ is the radius of the carcass, measured from the axis of the tire to the top of the carcass, $R_e$ is the radius of the carcass, measured from the axis of the tire to the region of the carcass of maximum axial width, $R$ is the radius of any given point, measured from the axis of the tire to that point, and $\psi$ is the angle formed with the axis of the tire by the tangent to the carcass at the point R.

If the carcass is tangent to the edges of the tread reinforcement at a distance $R_1$ from the axis of the tire, the tangent forming an angle $\psi_1$ with respect to the tire axis, equation (1) makes it possible to calculate $R_e$ by replacing R by $R_1$ and $\psi$ by $\psi_1$ and using the radius $R_s$ relating to the tread reinforcement. Naturally in order to obtain the radii $R_1$ and $R_s$ of the tread reinforcement in inflated condition, there should be taken into account the increase in radius dR which the tread reinforcement may undergo because of the inflation pressure. It is advisable to effect a slight correction in order to take into account the thickness of the carcass cords and have the dimensions correspond to the neutral fiber of the carcass cords.

The radius $R_e$ corresponding to the maximum width of the carcass having been calculated, equation (1) then makes it possible to calculate the radius $R_2$ of the point of connection of the sidewall and the bead. As is known, a bead is by construction rigid and nondeformable due to the presence of a non-stretchable steel wire and due to the wedging thereof on the rim. In the bead, the angle of the carcass cords with the axis is invariable. In a conventional construction, this angle at the end of the bead is of the order of 45°, or more precisely its complement to 180°, namely 135°. By taking for $\psi$ a value of 135° and for $R_e$ the value previously found, equation (1) makes it possible to determine the radius $R_2$ of the junction of the sidewall and the bead.

The following operation consists in determining the length of the cords of the carcass in equilibrium under the action of the inflation pressure between the radii $R_1$ and $R_2$. This length S is given by equation (2):

$$S = \int_{R_1}^{R_2} \frac{(R_s^2 - R_e^2) dR}{\sqrt{(R_s^2 - R_e^2)^2 - (R^2 - R_e^2)^2}} \quad (2)$$

Equation (2) is derived from equation (1) by an elementary calculation. Finally, it is easy to determine the total length of the carcass by adding to the length S corresponding to the development between the bead and the tread reinforcement the length of carcass included within the bead and the length of carcass tangent to the tread reinforcement. If there is an elongation of the cords because of the inflation pressure, it must, of course, be taken into account in order to determine the length of the carcass cords in non-stretched condition.

As is seen, calculation makes it possible to determine, as a function of the characteristics of the tread reinforcement and of the beads, the length a carcass ply should have in order that, in the inflated tire, it tangentially adjoins the tread reinforcement at the edges or near the edges thereof.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 2:
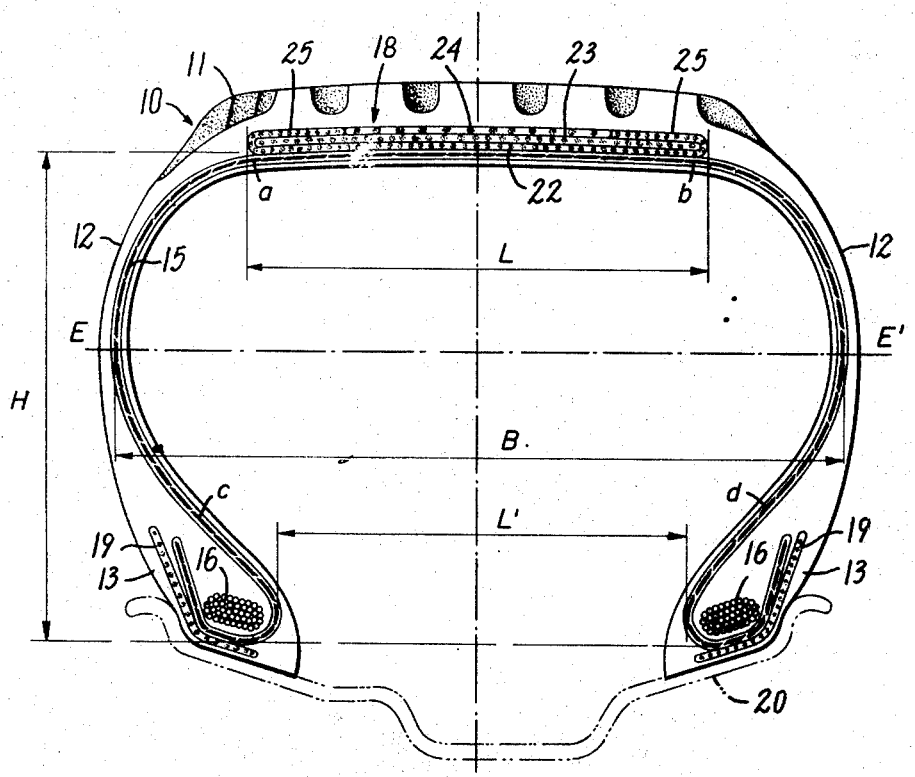
FIG. 2 is a fragmentary view in radial section of a tire in accordance with the invention in inflated condition.

FIG. 2 shows a tire 10 mounted on a rim 20, the tire being of a size 11 × 24.5. It has a tread 11 and two sidewalls 12 terminated by beads 13 the seats of which on the rim are inclined 15° with respect to the axis of the tire. The reinforcement of the tire comprises a carcass 15 anchored on steel bead wires 16, a tread reinforcement 18 and reinforcements 19 in the beads.

The carcass 15 comprises a single ply of steel cables arranged in radial planes of the tire, as shown in the drawing.

The tread reinforcement 18 comprises three successive plies 22, 23, and 24. The ply 22 is extended by portions 25 which are folded over the ply 23 so as to join the edges of the ply 24. The folded regions 25 of the ply 22 each correspond to about 2/9 of the width L of the tread reinforcement. This width L is about 180 mm and is definitely greater than the width L' of the carcass at the location of the steel bead wires. The three plies, 22, 23 and 24 are formed of flexible steel cables. The cords of the ply 22 are inclined by an angle of 15° towards the right in the central portion and towards the left in the folded zones 25. Those of the ply 23 form an angle of 22° towards the left and those of the ply 24 an angle of 51° towards the left, all these angles being defined with respect to the circumferential direction.

Figure 1:
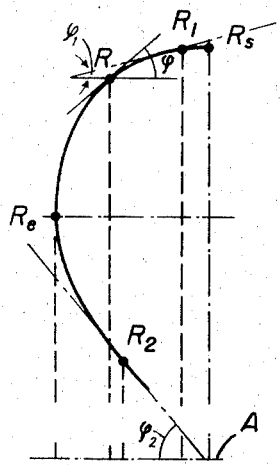
FIG. 1 is a diagrammatic view in radial section of carcass equilibrium profile and illustrates the definition of the expressions used in the formulas.

As shown in the drawing, the tread reinforcement 18 is substantially cylindrical (i.e., substantially flat in the plane of FIG. 2). The radius of transverse curvature is about 1,000 mm as compared to about 500 mm for the radius of longitudinal curvature. That is, the radius of longitudinal curvature has its origin at the axis A (FIG. 1) of the tire, while the radius of transverse curvature has its origin at a point below the axis A, ranging to infinity (in the case of a tire having a flat (cylindrical) tread reinforcement). The result is that the tread reinforcement forms an angle of the order of 5° with the axis of rotation of the tire in the vicinity of the points a and b.

The carcass 15 is substantially in contact with the tread reinforcement 18 between the points a and b. It moves away from the points a and b, in the direction towards the steel bead wires 16, tangentially to the tread reinforcement 18. This is true not only of the uninflated tire or a tire having the shape which the curing mold has imparted to it, but also of a tire in inflated condition, when the inflation pressure places the carcass cords under tension.

The meridian profile of the carcass between, on the one hand, the points of tangency a and b with the ends of the tread reinforcement and, on the other hand, the points of connection c and d of the sidewalls with the beads 13 comprises two very distinct regions. One, located above the line E—E' defining the zone of maximum axial width, is strongly curved and of relatively small height (approximately 40 percent of the height H of the carcass). The other, located below the line E—E', is only slightly curved and assumes in the direction of the beads a shape approaching that of a cone. The maximum axial width B of the carcass 15 is relatively large as compared to its height H. In the case of the drawing, the ratio H/B is close to 0.65.

The meridian profile of the carcass described above is obtained by imparting to the cords of the carcass a suitable length between the points a and c on the one hand and b and d on the other hand, that is to say in the two regions in which the carcass is not enclosed within the rigid, undeformable structures of the tread reinforcement and the beads. The use of inelastic steel cables to form the carcass assures the maintaining of the length of the cables between such points when the tire is inflated.

Thus there is provided in accordance with the invention a novel and highly-effective pneumatic tire of the radial-carcass type which is adapted to run continuously at high speed without danger of ply separation. Many modifications of the representative embodiments disclosed herein will readily occur to those skilled in the art. For example, the tire can be made in sizes and of materials other than the ones specifically disclosed. Accordingly, the invention is to be construed as including all the embodiments thereof within the scope of the appended claims.

I claim:

1. A tire comprising a tread portion, a pair of sidewalls respectively extending radially inwardly from opposite edges of said tread portion, a pair of beads respectively at radially inner edges of said sidewalls, a pair of bead wires respectively in said beads, a carcass reinforcement comprising continuous, radially extending cords and having opposite edges respectively anchored on said bead wires and extending through said beads, sidewalls and tread portion, and a tread reinforcement, said carcass reinforcement, when the tire is inflated, following, between said beads and said tread reinforcement, its natural equilibrium profile, said tread reinforcement having a longitudinal curvature and a transverse curvature less than said longitudinal curvature, so that said tread reinforcement is substantially cylindrical, and being strengthened at its edges, and said carcass reinforcement and tread reinforcement meeting tangentially at the edges of said tread reinforcement and being substantially in contact with each other over the entire width of said tread reinforcement and a width at least equal to the minimum width of said carcass reinforcement at the height of said bead wires.

2. A tire according to claim 1 wherein $$\cos \psi_1 = R_1^2 - R_e^2/R_s^2 - R_e^2$$

$R_1$ being the radius of the tire at the points where said carcass reinforcement and said tread reinforcement meet, $\psi$ being the angle between said carcass reinforcement and the axis of the tire at the points where said carcass reinforcement and said tread reinforcement meet, $R_s$ being the maximum radius of said carcass reinforcement, and $R_e$ being the radius of the points of the carcass farthest from the median plane of the tire.

3. A tire according to claim 2 wherein $$\cos \psi_2 = R_2^2 - R_e^2/R_s^2 - R_e^2$$

$R_2$ being the radius of the tire at the points where said carcass reinforcement meets said beads, and $\psi_2$ being the angle between said carcass reinforcement and the axis of the tire at the points where said carcass reinforcement meets said beads.

4. A tire according to claim 3 wherein $$S = \int_{R_1}^{R_2} \frac{(R_s^2 - R_e^2) dR}{\sqrt{(R_s^2 - R_e^2)^2 - (R^2 - R_e^2)^2}},$$

$S$ being the length of said cords between the points where said carcass reinforcement meets said tread reinforcement and the points where said carcass reinforcement meets said beads.

5. A tire according to claim 1 wherein $$0.60 < H/B < 0.75,$$

$H$ being the height of said carcass in the inflated condition of the tire, and $B$ being the width of said carcass in the inflated condition of the tire.

* * * * *